US009160193B2

United States Patent
Tonegawa et al.

(10) Patent No.: US 9,160,193 B2
(45) Date of Patent: Oct. 13, 2015

(54) ELECTRICITY CHARGING SYSTEM

(75) Inventors: Hiromi Tonegawa, Kounan (JP);
Tetsuhiro Ishikawa, Miyoshi (JP);
Shinji Ichikawa, Toyota (JP); Daisuke Ishii, Toyota (JP); Katsutoshi Murawaka, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 341 days.

(21) Appl. No.: 13/701,950

(22) PCT Filed: Jul. 11, 2011

(86) PCT No.: PCT/IB2011/001612
§ 371 (c)(1),
(2), (4) Date: Dec. 4, 2012

(87) PCT Pub. No.: WO2012/007817
PCT Pub. Date: Jan. 19, 2012

(65) Prior Publication Data
US 2013/0141054 A1     Jun. 6, 2013

(30) Foreign Application Priority Data

Jul. 16, 2010 (JP) ................................ 2010-162189

(51) Int. Cl.
*H02J 7/04* (2006.01)
*H02J 7/00* (2006.01)
(Continued)

(52) U.S. Cl.
CPC ............. *H02J 7/007* (2013.01); *B60L 11/1824* (2013.01); *B60L 11/1848* (2013.01); *G07F 15/005* (2013.01); *H02J 7/0004* (2013.01); *H02J 7/0052* (2013.01); *Y02T 10/7005* (2013.01); *Y02T 90/121* (2013.01); *Y02T 90/128* (2013.01); *Y02T 90/14* (2013.01); *Y02T 90/16* (2013.01);
(Continued)

(58) Field of Classification Search
CPC ....................................................... H02J 7/0086
USPC ........................................................ 320/162
See application file for complete search history.

(56) References Cited

U.S. PATENT DOCUMENTS 5,623,194 A * 4/1997 Boll et al. ..................... 320/137
6,326,884 B1 * 12/2001 Wohlrabe ..................... 375/259
2011/0101915 A1   5/2011 Mitsutani

FOREIGN PATENT DOCUMENTS

JP        A-54-26445        2/1979
JP        A-03-242573       10/1991
(Continued)

OTHER PUBLICATIONS

"Battery Charger Communication System," *Research Disclosure*, Nov. 1, 1987, vol. 283, No. 53, Mason Publications, Hampshire, Great Britain.
(Continued)

*Primary Examiner* — Edward Tso
*Assistant Examiner* — Ahmed Omar
(74) *Attorney, Agent, or Firm* — Oliff PLC

(57) ABSTRACT

An electricity charging system includes: a charger portion that charges a storage battery; a detection portion that detects an amount of charge stored in the storage battery; and a control portion that controls electric power that is supplied to charge the storage battery by the charger portion so that the electric power changes by a predetermined rule, according to the amount of stored electricity detected by the detection portion.

9 Claims, 7 Drawing Sheets

(51) Int. Cl.
   *B60L 11/18*     (2006.01)
   *G07F 15/00*    (2006.01)
(52) U.S. Cl.
   CPC .............. *Y02T90/163* (2013.01); *Y02T 90/169* (2013.01); *Y04S 30/14* (2013.01)

(56) References Cited

FOREIGN PATENT DOCUMENTS

| JP | A-03-242574 | 10/1991 |
| JP | A-06-138512 | 5/1994 |
| JP | A-2003-151645 | 5/2003 |
| JP | A-2003-319563 | 7/2003 |
| JP | A-2005-198445 | 7/2005 |
| JP | A-2008-29154 | 2/2008 |
| WO | WO 2010/067417 A1 | 6/2010 |

OTHER PUBLICATIONS

Partial translation of Office Action issued in Japanese Patent Application No. 2010-162189 dated Nov. 19, 2013.

* cited by examiner

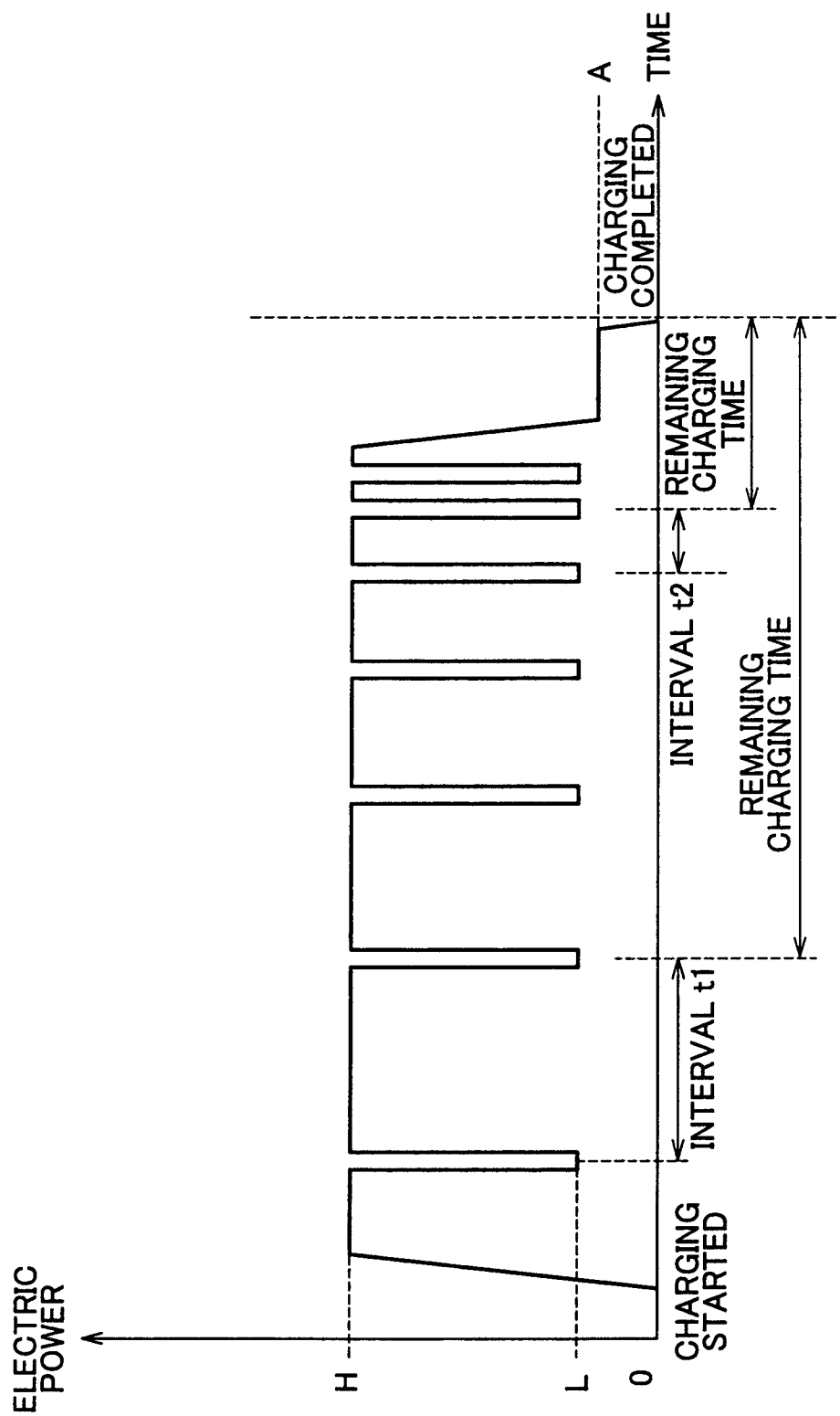

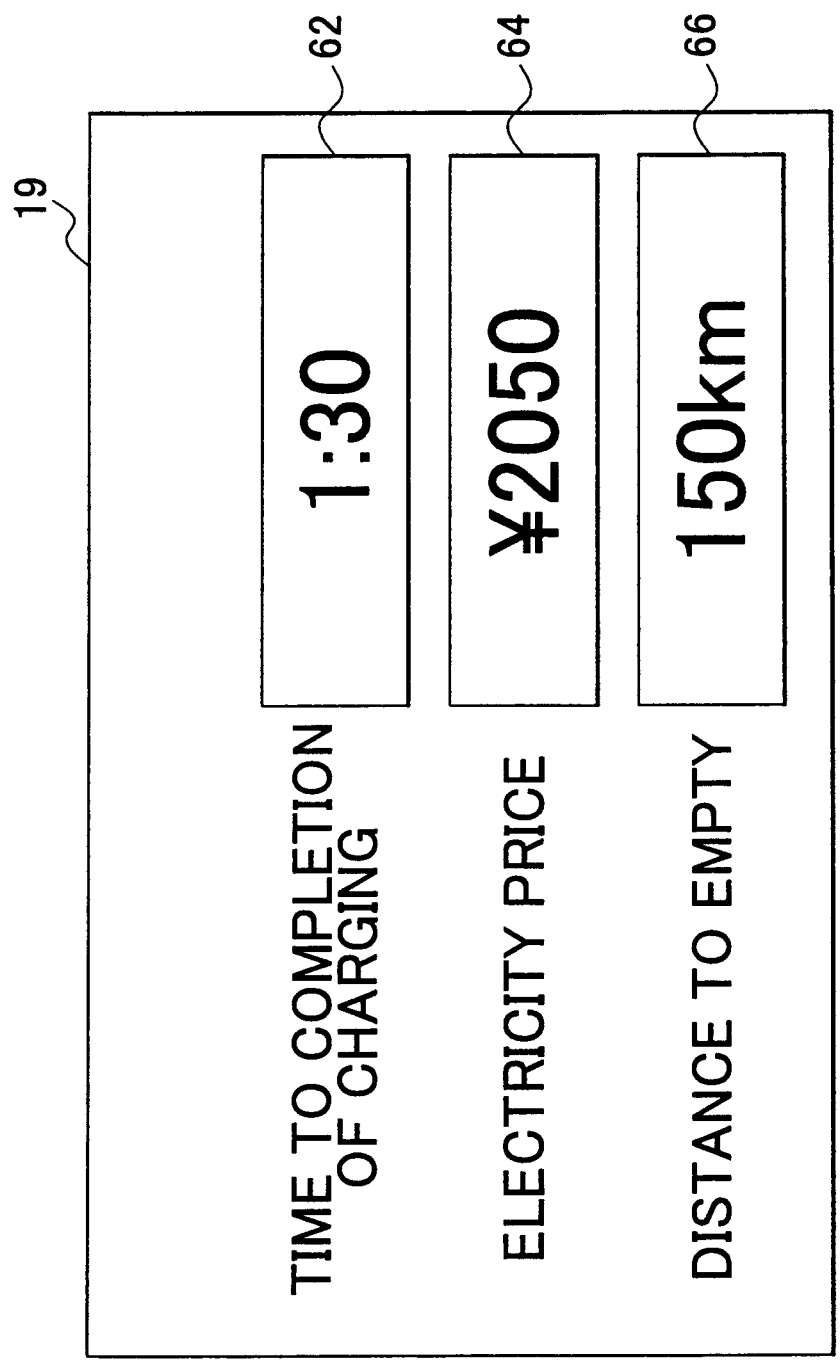

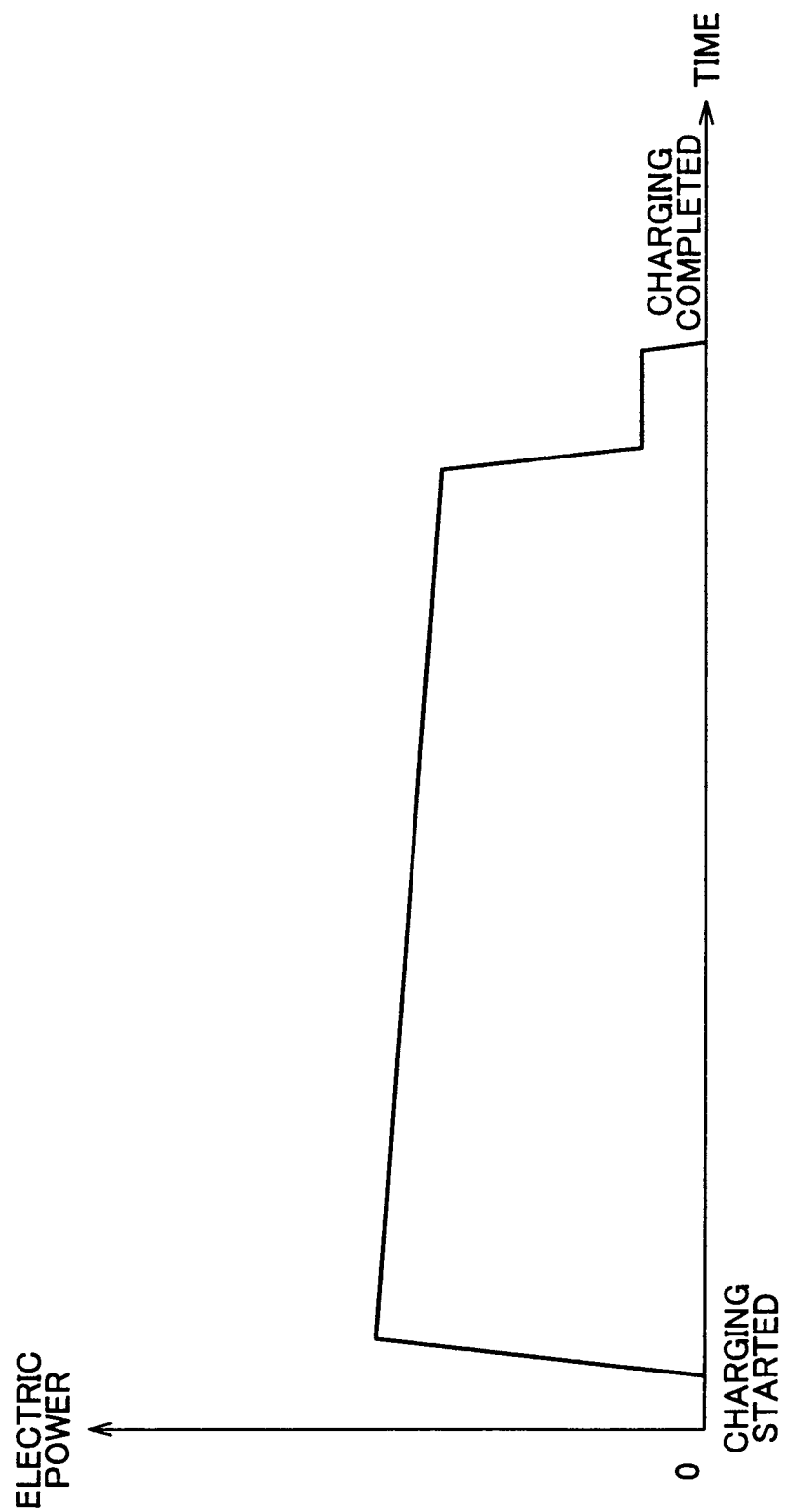

ELECTRICITY CHARGING SYSTEM

BACKGROUND OF THE INVENTION

1. Field of the Invention

The invention relates to an electricity charging system and, more particularly, to an electricity charging system that clearly shows information regarding the amount of stored electricity of a storage battery that is being charged.

2. Description of Related Art

When a storage battery is being charged, information that is important to a user of the storage battery is information regarding how long it is before the charging ends, information regarding how much electricity has been stored at the present time point, etc.

Japanese Patent Application Publication No. 03-242574 (JP-A-03-242574) discloses a technology that displays an amount of electricity remaining in the storage battery by using as an index the amount of electricity stored into the storage battery per unit time from an empty state to a fully charged state.

Besides, Japanese Patent Application Publication No. 2003-319563 (JP-A-2003-319563) discloses an electronic appliance that changes the charging mode during the charging of a battery pack or stops the charging by transmitting, by communication, information regarding charging electricity between the battery pack and an electronic appliance that has an electrical charging function.

However, in the foregoing technology described in Japanese Patent Application Publication No. 03-242574 (JP-A-03-242574), since the amount of electricity stored per unit time is used as an index, there is a problem of the index being unable to show whether the storage battery is relatively close to the empty state or relatively close to the fully charged state.

In the technology described in Japanese Patent Application Publication No. 2003-319563 (JP-A-2003-319563), a facility for communicating information is needed in addition to the facility for sending electric power from the charging side to the storage battery. For the communication, compatible communication protocols need to be adopted at the charging side and the storage battery side, so that the compatibility with other types of charging appliances is lost. Besides, in the case where the charging side is provided as a facility that is installed in a building and the storage battery is mounted in a vehicle, there is a possibility of the facility for the communication being wasted by the vehicle user's replacement purchase.

In any case, the foregoing technologies have a problem of requiring the two sides to have communication facilities for exchanging information regarding the amount of electricity stored in the storage battery.

SUMMARY OF THE INVENTION

The invention provides an electricity charging system that clearly shows information regarding the amount of electricity stored in a storage battery that is being charged, without requiring a communication facility for exchanging information regarding the amount of electricity stored in the storage battery.

A first aspect of the invention relates to an electricity charging system. This electricity charging system has: a charger portion that charges a storage battery; a detection portion that detects an amount of charge stored in the storage battery; and a control portion that controls electric power that is supplied to charge the storage battery by the charger portion so that the electric power changes by a predetermined rule, according to the amount of stored electricity detected by the detection portion.

The foregoing electricity charging system may further include a display portion that displays amount-of-stored-electricity information that is information regarding the amount of stored electricity of the storage battery, according to the rule and the electric power being supplied to the storage battery to charge the storage battery while the storage battery is being charged by the charger portion.

Besides, the display portion may clearly show the amount-of-stored-electricity information to a user.

Since while the storage battery is being charged by the charger portion the display portion displays the amount-of-stored-electricity information that is information regarding the amount of electricity stored in the storage battery, according to the rule and the electric power being supplied to the storage battery in order to charge the storage battery, the system is able to display information regarding the amount of stored electricity of the storage battery that is being charged without requiring a communication facility for communicating information regarding the amount of stored electricity of the storage battery.

In the electricity charging system, the electric power supplied to the storage battery to charge the storage battery may be able to be supplied at one electric power of a plurality of electric powers different in magnitude, and the predetermined rule may be a rule that determines at which one of the plurality of electric powers the electric power is to be supplied, according to the amount of stored electricity detected by the detection portion. In other words, the electric power that is supplied to the storage battery may be varied in accordance with the predetermined rule, which sets the electric power that is supplied to the storage battery based on the detected amount of charge in the storage battery.

Since the electricity charging system adopts a rule in which a plurality of electric powers different in magnitude are used, the electricity charging system is able to display information regarding the amount of electricity stored in the storage battery, merely by monitoring changes in the electric power.

The plurality of electric powers may be two electric powers, and the predetermined rule mat be a rule in which incidence of one of the two electric powers being supplied increases with an increase in the amount of stored electricity detected by the detection portion.

According to this electricity charging system, it becomes possible to simplify the control by using two electric powers different in magnitude and by adopting the rule in which the incidence of one of the two electric powers being supplied increases with increases in the amount of electricity stored in the storage battery.

The storage battery may be charged with a larger one of the two electric power.

Therefore, as the electric power for charging the storage battery, the larger one of the two electric power can be used.

The display portion may display a required time to fully charge the storage battery, according to the rule and the electric power.

Therefore, the electricity charging system is able to clearly show the amount of time preceding completion of the charging of the storage battery, which is very important information to the user.

The display portion may display an electricity price needed for charging the storage battery to full charge, according to the rule and the electric power.

Therefore, the electricity charging system is able to clearly show the electricity price needed for the charging of the storage battery, which is very important information to the user.

If the electricity price needed for charging the storage battery is set on a period-specific rate basis or on a time-of-day rate basis, the display portion may display the electricity price based on an electricity price table in which information that shows the electricity price for each period or for each time of day is recorded.

Therefore, even in the case where the electricity price needed for the charging is set on a period-specific rate basis (that includes a time-of-year rate basis) or on a time-of-day rate basis, the electricity charging system is able to display accurate electricity price.

If the storage battery is a storage battery for use for moving a vehicle, the display portion displays an instantaneous indication of distance the vehicle can travel until all charge in the storage battery is depleted according to the rule and the electric power.

Therefore, the electricity charging system is able to display the distance to empty of the vehicle at the, present time point, which is very important information to the user.

A second aspect of the invention relates to an electricity charging system. This electricity charging system includes: a charger portion that charges a storage battery; a detection portion that detects an amount of charge stored in the storage battery; a control portion that controls electric current that is supplied to charge the storage battery by the charger portion so that the electric current changes by a predetermined rule, according to the amount of stored electricity detected by the detection portion; and a display portion that displays amount-of-stored-electricity information that is information regarding the amount of stored electricity of the storage battery, according to the rule and the electric current being supplied to the storage battery to charge the storage battery while the storage battery is being charged by the charger portion.

A third aspect of the invention relates to a control method for an electricity charging system. The electricity charging system includes a charger portion that charges a storage battery, and a detection portion that detects an amount of charge stored in the storage battery, and a display portion that displays information regarding the amount of stored electricity of the storage battery. The control method for this electricity charging system includes: controlling electric power that is supplied to charge the storage battery by the charger portion so that the electric power changes by a predetermined rule, according to the amount of stored electricity detected by the detection portion; and displaying the information regarding the amount of stored electricity of the storage battery, according to the rule and the electric power being supplied to the storage battery to charge the storage battery while the storage battery is being charged by the charger portion.

According to the electricity charging systems and the control method therefore in accordance with the foregoing aspects of the invention, it is possible to provide an electricity charging system that displays information regarding the amount of stored electricity of the storage battery that is being charged, without requiring a communication facility for communicating information regarding the amount of electricity stored in the storage battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a diagram showing a general view of processes that are performed in the electricity charging system;

FIG. 5 is a diagram showing another example of a user interface (sheet 2);

FIG. 7 is a diagram showing an example of another rule.

DETAILED DESCRIPTION OF EMBODIMENTS

Embodiments of the invention will be described hereinafter with reference to the accompanying drawings.

Figure 1:
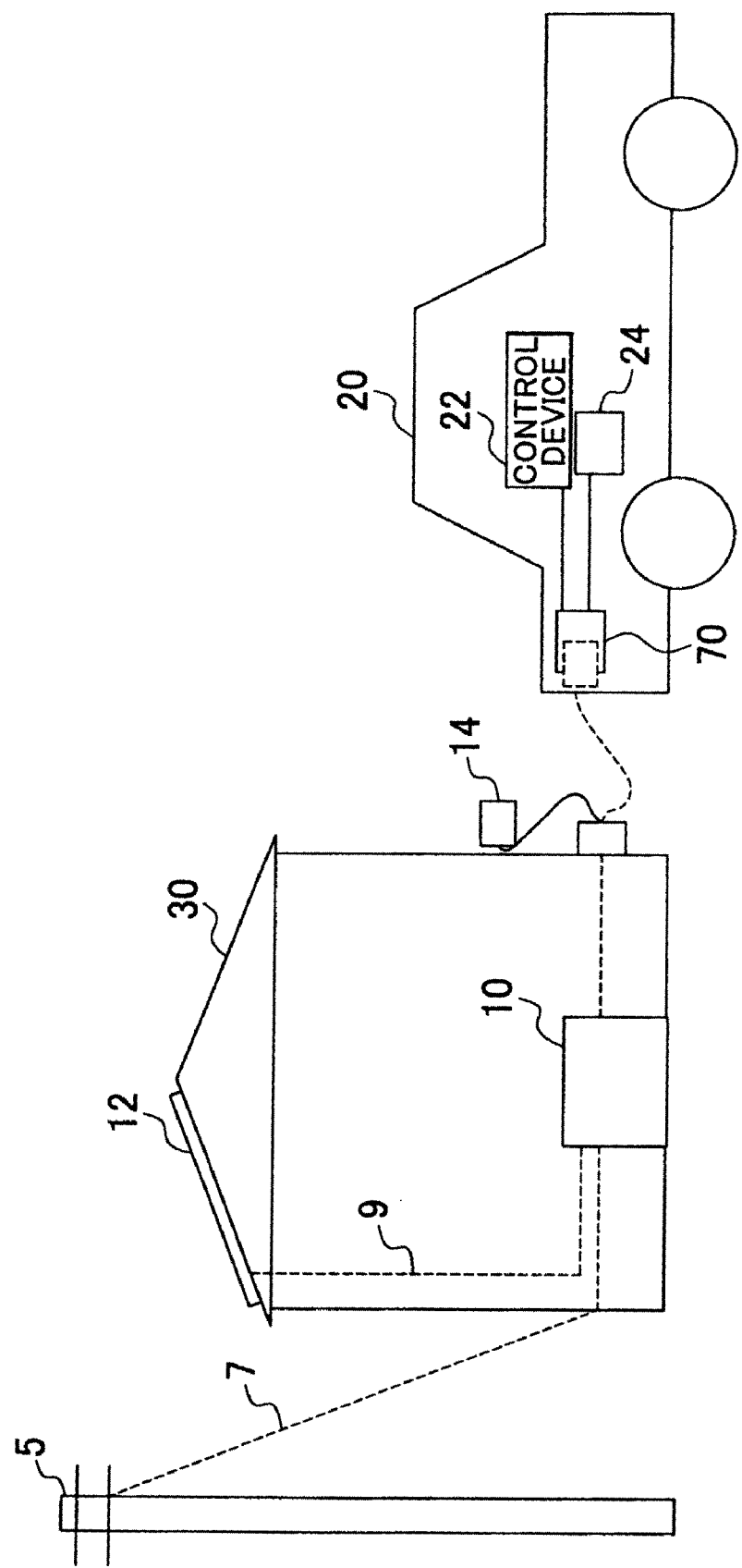
FIG. 1 is a diagram showing an example of a construction of an electricity charging system.

FIG. 1 is a diagram showing a construction that includes an electricity charging system in accordance with the invention. FIG. 1 shows an utility pole 5, electric cables 7 and 9, a building 30, a solar battery 12, a charging apparatus 10, a feed connector 14, and a vehicle 20

Among these component members, the electric pole 5 is provided for supplying a system power. The electric power is supplied to the building 30 by the electric cable 7 and, particularly, is supplied to the charging apparatus 10 in this embodiment. The solar battery 12 converts light energy into electric power, which is supplied to the charging apparatus 10 by the electric cable 9. The feed connector 14 is a connector for supplying electric power to the vehicle 20. The charging apparatus 10 is an apparatus that controls the charging of a storage battery 24 that is provided in the vehicle 20. Although detailed descriptions will be given later, this embodiment, as shown in FIG. 1, eliminates the need for a communication facility for exchanging information regarding the amount of electricity stored in the storage battery as well as the need for a facility provided for supplying electric power.

The vehicle 20 is further equipped with an electric power receiving connector 70, a storage battery 24, and a control device 22. The electric power receiving connector 70 is a connector for connecting to the feed connector 14, and for supplying the vehicle with electric power supplied from the feed connector 14. The electric power supplied from the electric power receiving connector 70 is supplied to the control device 22 and the storage battery 24.

A control device 22 is constructed of a CPU (central processing unit), a RAM (random access memory), a ROM (read-only memory), etc. (not shown). The control device 22 performs controls of, for example, detection of the amount of electricity stored in the storage battery 24.

Figure 2:
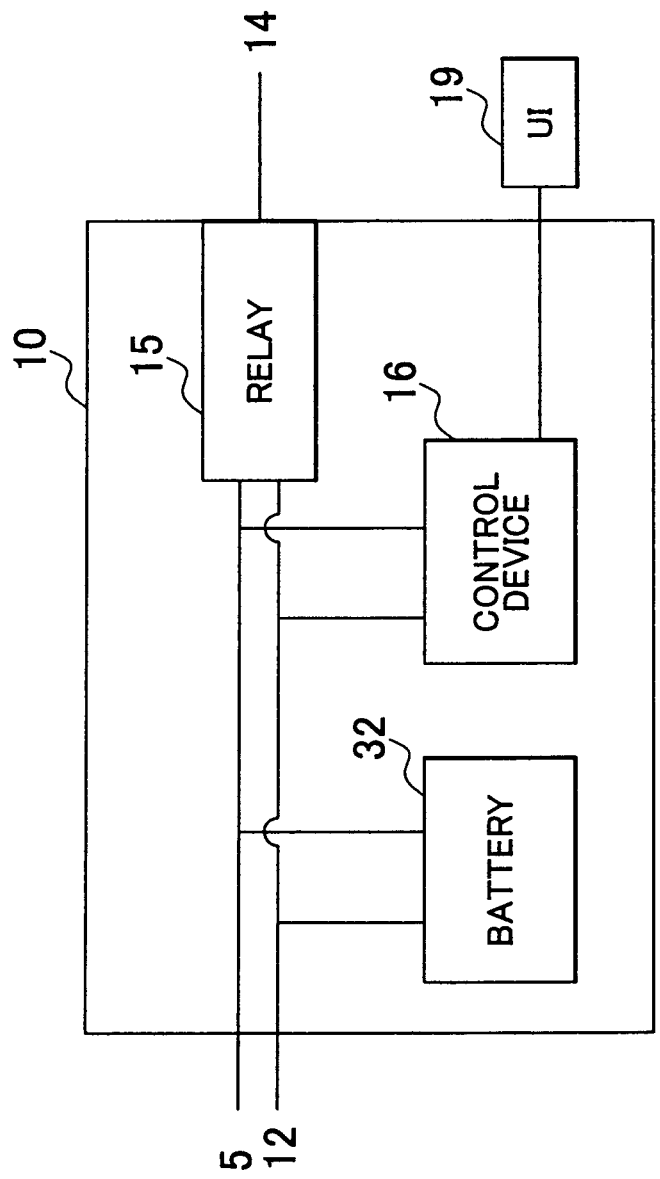
FIG. 2 is a diagram showing an example of a construction of a charging apparatus.

Next, a construction of the charging apparatus 10 will be described with reference to FIG. 2. The charging apparatus 10 includes a battery 32, a control device 16, a user interface (UI) 19 and a relay 15. The charging apparatus 10 is supplied with electric power from the utility pole 5 and the solar battery 12 as mentioned above. The supplied electric power is supplied to the feed connector, the control device 16 and the user interface 19, via the battery 32 and the relay 15.

Among these components, the battery 32 is used to temporarily store electric power supplied, and can be charged, for example, by using low-cost midnight electric power, or the like. The control device 16 is made up of a CPU, a RAM, a ROM, etc. (not shown).

The user interface 19 clearly shows electric power information that is information regarding the storage battery 24, on the basis of the electric power for charging the storage battery 24, while the charging apparatus 10 is charging the storage battery 24. Details of the user interface 19 will be described later.

The relay 15 is a switch for supplying electric power to the feed connector 14 and discontinuing the supply thereof, and is controlled by the control device 16.

Among these constructions, constructions that constitute the electricity charging system are the charging apparatus 10, the control device 22, the user interface 19, the storage battery 24, an apparatus or the like that supplies electric power to the charging apparatus 10, and an apparatus or the like that electrically connects the charging apparatus 10 and the storage battery 24 so that the charging apparatus 10 can charge the storage battery 24.

Next, a general view of the processes performed in the electricity charging system of this embodiment will be described with reference to FIG. 3. In a graph shown in FIG. 3, the vertical axis shows the electric power for charging the storage battery 24, and the horizontal axis shows time. This is a graph in conjunction with a system in which the electric power supplied to the storage battery 24 to charge the storage battery 24 is able to be supplied at any one of a plurality of electric powers (electric power levels or values) that are different in magnitude, the graph being presented for describing a predetermined rule that determines at which one of the plurality of electric powers (electric power levels or values) the electric power is to be supplied to the storage battery 24, according the amount of stored electricity detected by the control device 22.

In particular, this graph shows a case where the number of the plurality of electric powers is two (electric power H and electric power L), and where the predetermined rule is a rule in which the greater the amount of storage electricity detected by the control device 22 becomes, the higher the incidence of one of the two electric powers (the charging with the electric power L) being supplied becomes.

Firstly, after the charging is started, the charging electric power reaches an electric power H, and remains at that value of electric power for some time. After that, the charging electric power drops to an electric power L, and soon increases to the electric power H again. The storage battery 24 may instead be charged with the larger one (electric power H) of the two electric powers (electric powers H and L).

After that, the electric power changes by a rule that is represented by combinations of two electric powers different in magnitude. The change in the electric power is controlled by the control device 22 that is provided in the vehicle 20.

As shown in FIG. 3, the rule is such that the larger the amount of stored electricity detected by the control device 22 becomes, the higher the incidence of appearance of one of the two values of electric power (the electric power L in this embodiment) becomes. This means that the interval at which the electric power drops to the electric power L becomes shorter (t1>t2) as the amount of stored electricity increases.

Although FIG. 3 shows a reduced number of incidents of appearance of the electric power L, provision of an increased number of aforementioned intervals (t1, t2, . . . , tn) makes it possible to more finely show the amount of stored electricity. Specifically, in this embodiment, the intervals serve as information that shows the amount of stored electricity.

Incidentally, in FIG. 3, the electric power does not change to the electric power L during the final charging with the electric power A, and the electric power changing to the electric power A shows that it is only a short time before the full charge of the storage battery 24 is reached. The size relation between the electric power A and the electric power L depends on the rule and the facility. For example, in the case where adverse effect occurs on the facility if the electric power is frequently changed between the vicinity of 0 and the electric power L, the electric power L is set to an electric power such that the adverse effect does not occur.

Besides, although in FIG. 3, the two electric powers (H and L) are used for the illustration, it is also permissible to make an arrangement in which a plurality of electric powers (A1, A2, . . . , An) can be supplied and to adopt such a rule that the larger the amount of stored electricity becomes, the higher the incidence of appearance of a certain electric power Ak (k=1 to n) becomes.

The change in electric power described above may well be detected by the charging apparatus 10 that supplies electricity. In the light of this, two user interfaces will be described as examples.

Figure 4A:
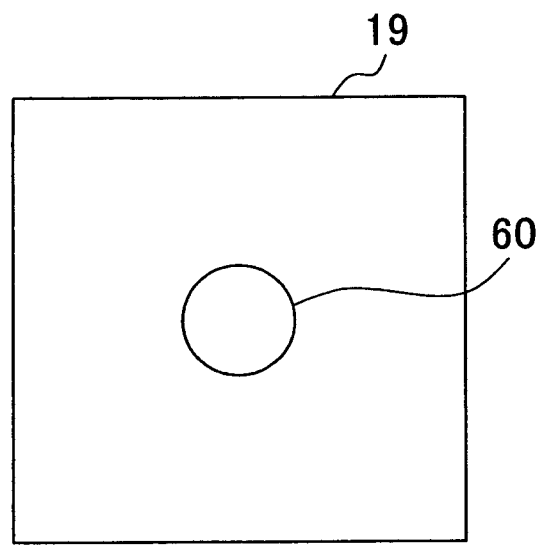
FIG. 4A and FIG. 4B are diagrams showing an example of a user interface (sheet 1)
Figure 4B:
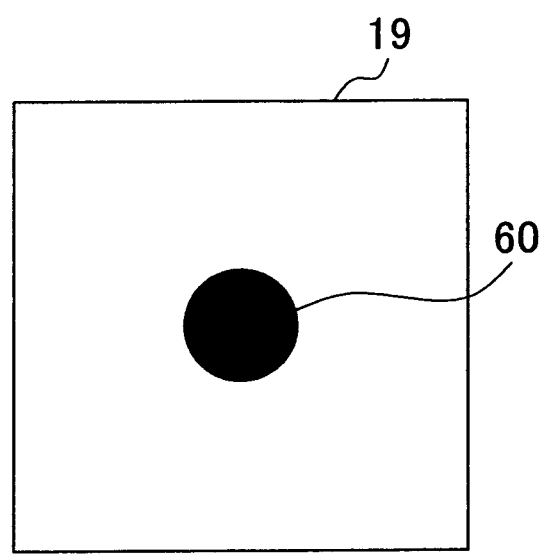

The user interface 19 shown in FIGS. 4A and 4B is a user interface that clearly shows the state of charge of the storage battery 24 as the intensity of the light of a monitor lamp 60 changes according to the electric power. FIG. 4A shows a state of the user interface 19 when the electric power is the electric power H, and FIG. 4B shows a state of the user interface 19 when the electric power is the electric power L. From the changes or switches in the intensity of light of the monitor lamp 60, the user can obtain electric power information regarding the storage battery 24. Specifically, when the light intensity switches between the two levels at long time intervals, the user knows that the amount of electricity stored in the storage battery 24 is still small. When the light intensity switches between the two levels at short time intervals, the user knows that the amount of electricity stored in the storage battery 24 is close to the full charge.

In the case of the user interface 19 shown in FIGS. 4A and 4B, it suffices that the control device 16 only has a function of merely turning on the monitor lamp 60. Besides, instead of the turning on of the monitor lamp 60, sound may also be used to clearly show the state of charge of the storage battery 24.

This simple facility allows the user to know the amount of stored electricity even if the user replaces the user's vehicle or has two or more vehicles.

Next, the user interface 19 shown in FIG. 5 is a user interface that shows as electric power information the time required until the storage battery becomes fully charged (the time 62 to completion of the charging), the electricity price needed for the full charge of the storage battery (electricity price 64), and the distance to empty 66 of the vehicle at the present time point.

In this case, information showing a relation between the aforementioned interval and the amount of stored electricity, the maximum amount of electricity storable in the storage battery 24, and the electric power needed for the vehicle 20 to travel are stored beforehand in the control device 22, for example, a ROM thereof. Then, if the interval at which the electric power changes to the electric power L is known, the amount of stored electricity can be found, so that the electricity price needed for the charging can be calculated from the amount of stored electricity. Beside, if the amount of stored electricity is known, the distance to empty of the vehicle 20 at the present time point can also be calculated.

Incidentally, if the electricity price for the charging is set on a time-of-year (or period-specific) rate basis or a time-of-day rate basis, the electricity price table in which information showing the electricity prices during individual times of year or day is recorded may be stored in the ROM, and the electricity price is clearly shown on the basis of the electricity price table.

Figure 6:
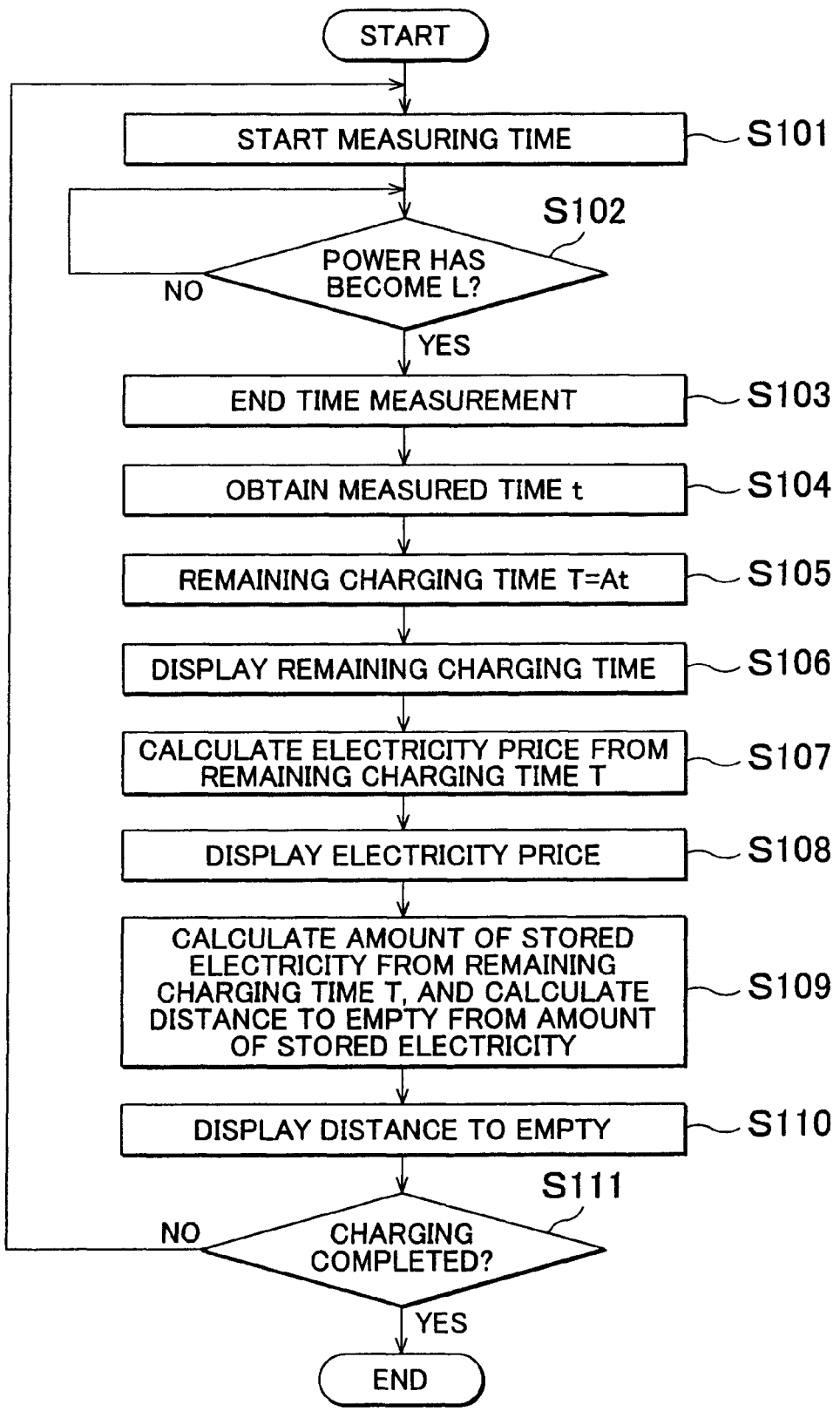
FIG. 6 is a flowchart showing a flow of process in the electricity charging system.

Details of processes performed in the electricity charging system will be described with reference to a flowchart shown in FIG. 6. The flowchart shown in FIG. 6 shows a flow of process executed by the control device 16.

Firstly in step 101, the time measurement is started simultaneously with the start of the electricity charging. When the electric power detected in step 102 becomes equal to the value L, the time measurement is ended in step 103. Then in step 104, the time t measured in step 104 (i.e., the interval) is obtained, and the remaining charging time T is calculated in step 105.

In this flowchart, since the time interval t monotonously decreases, the remaining charging time T is set as T=At. However, this expression is not restrictive. Besides, a table that shows a correspondence relation between the time t showing aforementioned intervals and the remaining charging time T may be stored beforehand in the ROM, and the remaining charging time T may be obtained by looking up the table.

After the remaining charging time T is calculated in the foregoing manner, the remaining charging time T is displayed as a time needed before the charging is completed as shown in FIG. 5.

Subsequently in step 107, the electricity charge is calculated from the remaining charging time T. Of course, since the interval t shows the amount of electricity stored, the electricity price may also be calculated directly from the interval t. After the electricity price is calculated, the electricity price is displayed as shown in FIG. 5 in step 108.

Subsequently in step 109, the amount of electricity stored can be found from the interval t, and the distance to empty is calculated from the amount of stored electricity by referring to the ROM. After the distance to empty is calculated in this manner, the electricity price is clearly shown as shown in FIG. 5 in step 110.

Then, in step 111, it is determined whether or not the charging is completed. If a negative determination is made in step 111, the process returns to step 101 in order to measure time again. If an affirmative determination is made in step 111, the process ends.

Although in the foregoing embodiment, the two electric powers H and L are used, a rule as shown in FIG. 7 may instead be adopted. The rule shown in FIG. 7 is a rule in which the electric power monotonously decreases according to the amount of electricity stored in the battery 24. In this case, the monitor lamp 60 (see FIG. 4) gradually loses its brightness, whereby the user can know the amount of stored electricity. Besides, in the case of the user interface 19 shown in FIG. 5, too, if a table or a mathematical expression that shows a relation between the electric power and the amount of stored electricity is pre-stored in the ROM, it is possible to know the amount of stored electricity from the present electric power.

Besides, although in the foregoing embodiment, the two electric powers H and L are used, two electric currents (values) may instead be used. This is because if voltage is constant, electric power is determined by electric current.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. An electricity charging system comprising:
a charger portion that charges a storage battery;
a detection portion that detects an amount of charge stored in the storage battery;
a control portion that controls electric power that is supplied to charge the storage battery by the charger portion wherein:
the electric power includes a first value of electric power and a second value of electric power,
a predetermined rule determines whether the first value of electric power or the second value of electric power is supplied to charge the storage battery according to an amount of stored electricity detected by the detection portion,
the first value of electric power supplied to the storage battery to charge the storage battery and the second value of electric power supplied to the storage battery to charge the storage battery differ in magnitude, and
the predetermined rule increases an incidence of one of the first value of electric power and the second value of electric power when an increase in the amount of stored electricity is detected by the detection portion; and
a display portion that displays amount-of-stored-electricity information that is information regarding the amount of stored electricity of the storage battery, according to the rule and the electric power being supplied to the storage battery to charge the storage battery while the storage battery is being charged by the charger portion.

2. The electricity charging system according to claim 1, wherein
the storage battery is charged with a larger one of the first electric power and the second electric power.

3. The electricity charging system according to claim 1, wherein
the storage battery is charged with a larger one of the two electric powers.

4. The electricity charging system according to claim 1, wherein
the display portion displays a required time to fully charge the storage battery, according to the rule and the electric power.

5. The electricity charging system according to claim 1, wherein
the display portion displays an electricity price needed for charging the storage battery to full charge, according to the rule and the electric power.

6. The electricity charging system according to claim 5, wherein
if the electricity price needed for charging the storage battery is set on a period-specific rate basis or on a time-of-day rate basis, the display portion displays the electricity price based on an electricity price table in which information that shows the electricity price for each period or for each time of day is recorded.

7. The electricity charging system according to claim 1, wherein
if the storage battery is a storage battery for use for moving a vehicle, the display portion displays an instantaneous indication of distance the vehicle can travel until all charge in the storage battery is depleted according to the rule and the electric power.

8. The electricity charging system according to claim 1, wherein the display portion clearly shows the amount-of-stored-electricity information to a user.

9. A control method for an electricity charging system that includes a charger portion that charges a storage battery, and a detection portion that detects an amount of charge stored in the storage battery, and a display portion that displays information regarding an amount of stored electricity of the storage battery, the control method comprising:

controlling electric power that is supplied to charge the storage battery by the charger portion wherein:

the electric power includes a first value of electric power and a second value of electric power, a predetermined rule determines whether the first value of electric power or the second value of electric power is supplied to charge the storage battery according to the amount of stored electricity detected by the detection portion, the first value of electric power supplied to the storage battery to charge the storage battery and the second value of electric power supplied to the storage battery to charge the storage battery differ in magnitude, and the predetermined rule increases an incidence of one of the first value of electric power and the second value electric power when an increase in the amount of stored electricity is detected by the detection portion; and displaying the information regarding the amount of stored electricity of the storage battery, according to the rule and the electric power being supplied to the storage battery to charge the storage battery while the storage battery is being charged by the charger portion.

* * * * *